United States Patent [19]

Conner

[11] Patent Number: 4,524,505
[45] Date of Patent: Jun. 25, 1985

[54] METHOD OF ASSEMBLING A PIPE JOINT

[75] Inventor: Randall C. Conner, Birmingham, Ala.

[73] Assignee: American Cast Iron Pipe Company, Birmingham, Ala.

[21] Appl. No.: 547,680

[22] Filed: Nov. 1, 1983

Related U.S. Application Data

[62] Division of Ser. No. 242,925, Mar. 12, 1981, Pat. No. 4,428,604.

[51] Int. Cl.³ .............................................. B23P 11/02
[52] U.S. Cl. ....................................... 29/453; 29/229; 29/526 R; 29/157 R
[58] Field of Search .................... 29/453, 229, 526 R, 29/157 R; 285/321, 39, 374, 18, 310, 23, 309

[56]  References Cited
U.S. PATENT DOCUMENTS

| | | |
|---|---|---|
| 1,873,621 | 8/1932 | Moore . |
| 2,009,650 | 7/1935 | Claussen et al. . |
| 2,097,628 | 11/1937 | Liebhardt . |
| 2,441,344 | 5/1948 | Bosworth .......................... 285/321 |
| 2,774,617 | 12/1956 | Lanninger . |
| 2,806,717 | 9/1957 | Hempel . |
| 2,877,732 | 3/1959 | Eaton .......................... 285/321 X |
| 2,883,083 | 4/1959 | Terry, Jr. et al. .......... 285/309 X |
| 2,991,092 | 7/1961 | MacKay . |
| 3,116,546 | 1/1964 | Smith .............................. 29/453 X |
| 3,167,331 | 1/1965 | Marshall .................. 285/321 X |
| 3,177,019 | 4/1965 | Osweiler . |
| 3,219,364 | 11/1965 | Wooldridge . |
| 3,381,983 | 5/1968 | Hanes . |
| 3,521,911 | 7/1970 | Hanes et al. . |
| 3,684,320 | 8/1972 | Platzer et al. . |
| 3,698,744 | 10/1972 | Bevington . |
| 3,716,576 | 12/1973 | Keyser ......................... 285/321 X |
| 3,884,510 | 5/1975 | Bram ............................. 285/374 X |
| 4,127,290 | 11/1978 | Mutschlechner .............. 285/374 X |
| 4,296,953 | 10/1981 | Nagao et al. ................... 285/321 X |

FOREIGN PATENT DOCUMENTS

| | | |
|---|---|---|
| 948463 | 8/1956 | Fed. Rep. of Germany . |
| 2162435 | 6/1973 | Fed. Rep. of Germany ...... 285/374 |
| 106916 | 8/1979 | Japan .................................. 285/374 |
| 106917 | 8/1979 | Japan .................................. 285/374 |
| 106918 | 8/1979 | Japan .................................. 285/374 |
| 632049 | 11/1949 | United Kingdom ............... 285/174 |
| 1077599 | 8/1967 | United Kingdom ............... 285/321 |

Primary Examiner—Charlie T. Moon
Attorney, Agent, or Firm—Kerkam, Stowell, Kondracki & Clarke

[57] ABSTRACT

A method of assembling a pipe joint uses a bearing ring with closure nuts and spreader nuts. The closure nuts are used to fix the ring to a spigot, which then has a socket disposed around it. The closure nuts are loosened such that the ring expands in diameter to seat in a groove in the socket. The spreader nuts are then used to expand the ring further to be securely within the groove.

14 Claims, 7 Drawing Figures

METHOD OF ASSEMBLING A PIPE JOINT

This is a Divisional of application Ser. No. 242,925, filed Mar. 12, 1981, now U.S. Pat. No. 4,428,604 iss. 1-31-84.

FIELD OF THE INVENTION

The present invention relates to restrained pipe joints and, more specifically, to a pipe joint including a snap ring which prevents axial movement of the bell end of one pipe relative to the spigot end of an attached pipe.

DESCRIPTION OF THE PRIOR ART

The use of pipe joints, couplings and fittings of the socket and spigot type is well known in the art and is shown, in U.S. Pat. No. 2,991,092, issued to Jack W. MacKay on July 4, 1961. The aforementioned MacKay patent, which is assigned to the assignee of the present invention and hereby incorporated by reference, discloses the use of a double sealing gasket for socket and spigot type joints. The simplicity and tightness of the seal in the joint disclosed in the MacKay patent makes this joint useful for a wide variety of applications. As is well known in the art, many such joints are continually subject in use to axial forces which tend to move one pipe away from the adjacent and connecting pipe.

Numerous attempts have been made in the prior art to construct pipe joints designed to withstand axial forces. Such pipe joints are often complex in construction and may require extensive modification of the basic socket and spigot ends of the connecting pipes. Often these prior art pipe joints require some form of bolt arrangement designed to clamp one pipe to the adjacent pipe. Such bolt type of pipe joints are generally ill suited for providing angular deflection after assembly between the spigot end of the pipe and the attached socket or bell end of the pipe. It should be noted that it is generally desirable for a pipe joint to accomodate limited angular deflection or pivoting movement between the spigot end of the pipe and the attached socket end of the pipe making up a particular pipe joint.

Another form of restrained pipe joint known in the prior art provides the spigot end of the pipe with a locking collar welded or otherwise attached to it. In such an arrangement, the bell member of the socket pipe is inserted between the locking collar and the spigot end of the pipe itself, whereupon the locking collar is rotated to an angular position relative to the bell member and locked therein such that the bell member may not be axially displaced relative to the locking collar and spigot. The rotation feature may be disadvantageous in certain respects. For example, the tolerance of the socket or bell member must be tightly controlled. If the bell member is too large it may prevent rotation and locking or it may bind on the locking collar of the spigot section making rotation of the locking collar extremely difficult. Alternatively, if the bell member is too small, it will not prevent back rotation of the locking collar, raising the possibility that the repeated application of fluid through the pipe may cause the locked joint to the undone. This structure is usually complex and is less than desirable in strength and cost.

Another form of known restrained pipe joints employs a snap-ring to secure the spigot and socket against separation. Snap-rings have generally required substantial modification to the basic spigot and socket interface, and usually need a slot or window in the socket pipe for allowing adjustment to the snap-ring diameter to lock or unlock the joint. Accessability to the snap-ring becomes a serious problem. In addition, if the gasket is carried by the spigot member and the snap-ring is carried by the bell member, as is the case in the prior art, the gasket must pass by the snap-ring member during installation. The gasket is thus susceptable and clearly vulnerable to damage in installation.

Accordingly, whereas the prior art has developed numerous techniques for axially restraining pipe joints from separation due to axial forces, the techniques are subject to several disadvantages.

An object of the present invention is to provide a new and improved method of assembling a pipe joint.

A more specific object of the present invention is to provide a method of assembling a pipe joint using a snap-ring assembly.

Yet another object of the present invention is to provide an improved restrained pipe joint having a snap-ring assembly readily accessible from outside the pipe joint.

Still another object of the present invention is to provide a method of assembling a restrained pipe joint including a socket member with only continuous annular contours. This pipe joint may include a socket member with no holes, slots, windows, or other discontinuities. In addition, no internal or external locking lugs may be required in the locking collar or socket member.

SUMMARY OF THE INVENTION

The above and other objects of the present invention are realized by a method of assembling a pipe joint assembly having a first pipe with a cylindrical socket, the cylindrical socket having a radially inward retaining lip adjacent a retaining groove; a second pipe with a cylindrical spigot, the cylindrical spigot having an outwardly projecting portion; a ring assembly including a bearing ring having two ends at a split, the bearing ring uniquely defining a plane, two transverse pieces, each transverse piece attached to one end of the bearing ring and extending away and outside from the plane defined by the bearing ring, a threaded rod mounted to extend between each of the two transverve pieces, a first spreader nut on the threaded rod, the first spreader nut operable to expand the diameter of the bearing ring, and a closure nut on the threaded rod, the first closure nut operable to contract the diameter of the bearing ring. The method steps comprise: contracting the bearing ring around the spigot adjacent to the outwardly projecting portion by adjusting the first closure nut to bring the transverse pieces closer together; positioning the spigot and the bearing ring within the socket, the transverse pieces extending out from the socket; loosening the bearing ring from the spigot such that the natural resilience of the bearing ring expands it to seat within the retaining groove, and tightening the bearing ring against the retaining groove by adjusting the first spreader nut to lock the pipe joint against axial separation by the bearing ring bearing between the retaining lip and the outwardly projecting portion. The positioning step causes the spigot to contact a rear of the socket. The bearing ring seats within the retaining groove by radial expansion movement only of the bearing ring following the positioning step. The positioning step causes the bearing ring to be clear and axially inside of the retaining lip and the bearing ring will necessarily seat within the retaining groove when its diameter in increased following the positioning step. The contracting step causes the transverse pieces to lie along an outer surface of the spigot, each of the transverse pieces touching the outer surface along its entire length. The threaded rod is threaded at both ends and the pipe joint assembly further includes a second spreader nut and a second closure nut. The loosening step includes adjusting one or both of the closure nuts.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views.

DESCRIPTION OF THE PREFERRED EMBODIMENTS

Figure 1:
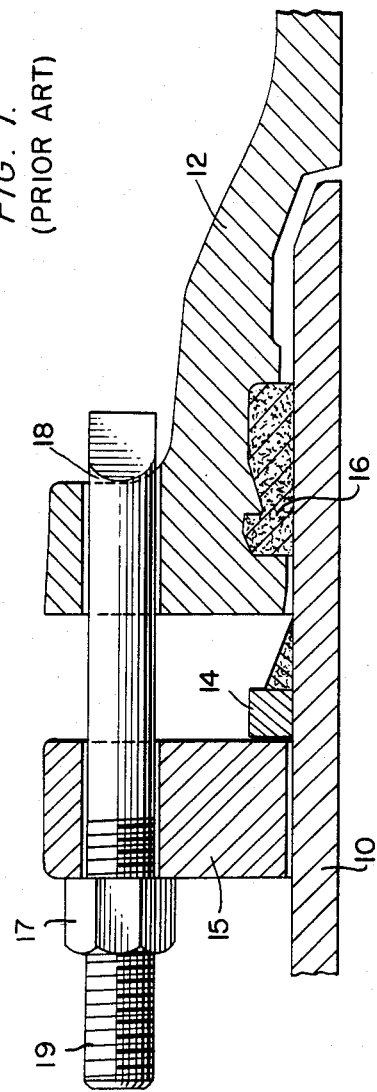
FIG. 1 and FIG. 2 represent cross-sectional views of prior art pipe joints.

Referring to the drawings, FIG. 1 shows in cross-section a particular type of an axially restrained pipe joint known to the prior art. The spigot end of pipe 10 is inserted within the bell end of pipe 12 with gasket 16 sealing the joint. Gasket 16 may be the double sealing action gasket of the aforenoted MacKay U.S. Pat. No. 2,991,092. A spigot ring 14 is welded or otherwise adhered to the spigot end pipe 10 as shown. Bell end 12 may include radially spaced through holes adapted to receive locking bolts which extend from a collar piece 15 so that the socket or bell end 12 is axially restrained by T head bolts 18.

Pressure is applied through nuts 17 which when threaded along threads 19 cause collar 15 and bell end 12 to be drawn toward each other, the position of collar 15 being limited by spigot ring 14.

Figure 2:
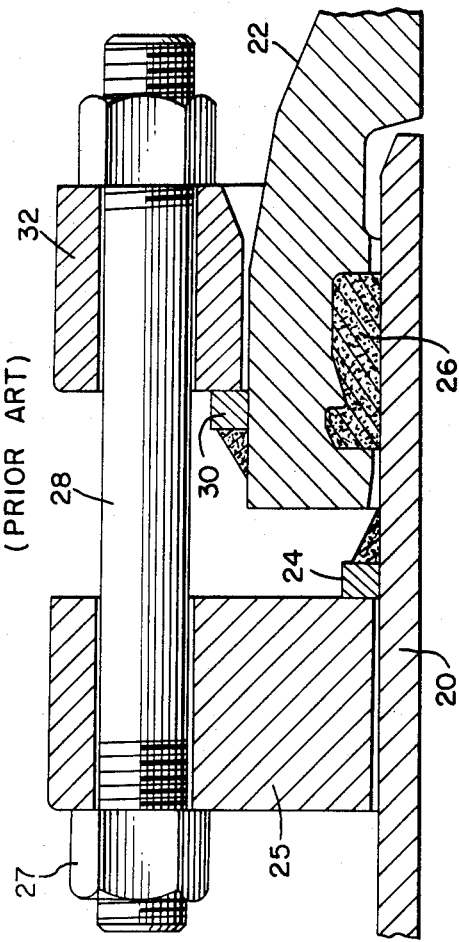

FIG. 2 shows a prior art arrangement similar to that of FIG. 1 except that the bell end of pipe 22 may rotate more freely relative to the spigot end of pipe 20. Those parts of the pipe joint of FIG. 2 which have corresponding parts in FIG. 1 are numbered by the FIG. 1 number plus 10. Collar piece 25 is caused to bear against spigot ring 24 by adjustment of nut 27 on stud 28 and a second nut threaded on the other end of the stud as shown. A bell or socket ring 30 is welded to the bell end of pipe 22 and bears against bell collar 32. Gasket 26 corresponds to the gasket 16 of FIG. 1. It should be noted that in the embodiment illustrated in FIG. 2, the collar 25 can rotate independently of the bell end pipe 22, whereas in the embodiment illustrated in FIG. 1, collar 15 is fixed in angle with respect to socket or bell end pipe 12.

Figure 3:
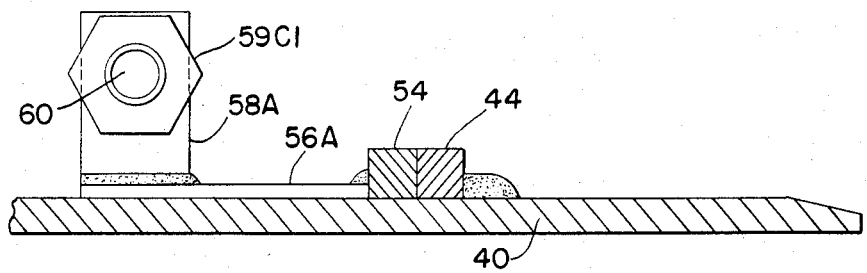
FIG. 3 is a cross-sectional fragmentary view of the spigot end of a pipe and a snap-ring in position ready for assembly into a bell end of a pipe to form a joint in accordance with the present invention.
Figure 4:
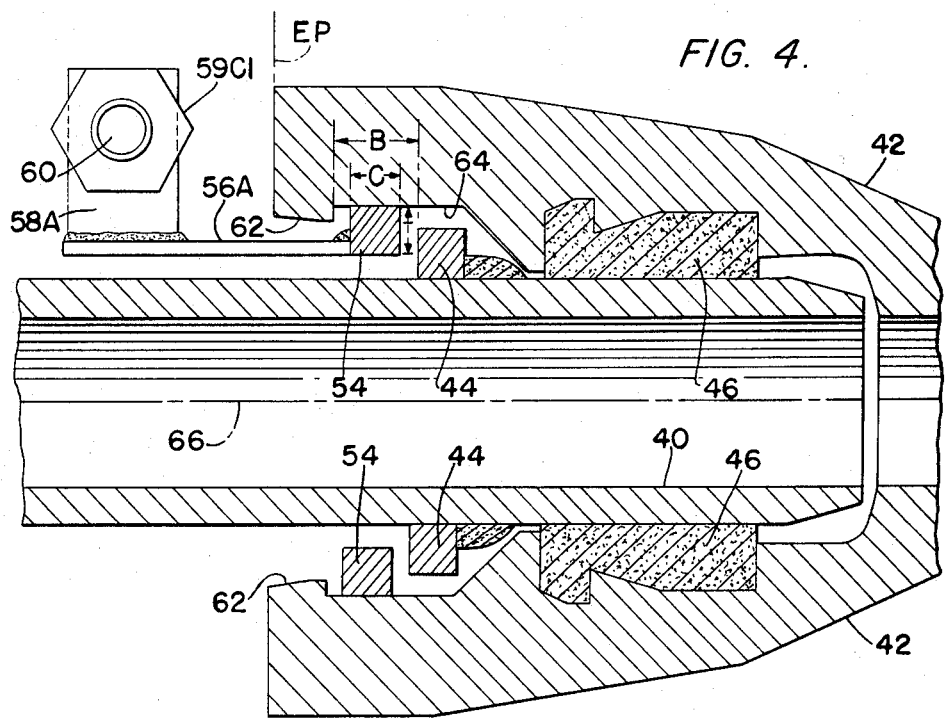
FIG. 4 is a cross-sectional fragmentary view of a joint according to the present invention.

FIGS. 3 and 4 illustrate a joint in accordance with the present invention. As shown in FIG. 3, a spigot 40 (representing the spigot end of a pipe) has welded or otherwise secured thereto a spigot ring 44, rectangular in cross-section, which preferably extends completely around the spigot 40. While the spigot ring 44 will usually extend circumferentially around the spigot 40, with its flat engaging surface positioned to lie flat against the spigot surface, in specific cases it may be desirable to have the spigot ring 40 positioned at an angle with respect to the circumference of spigot 40 as will be discussed below with reference to FIG. 6. As shown in FIG. 3, snap-ring 54 is positioned to extend in a circumference around spigot 40 adjacent to the spigot ring 44 as shown. Snap-ring 54 is split so that its natural resiliency causes the two ends to spread slightly, thus expanding the ring. Attached to each end of the split snap ring 54 is a transverse piece 56 which extends outwardly therefrom and which has affixed thereto by welding or the like an outwardly extending lug 58. Lug 58 is provided with a drilled hole through which is threaded stud 60. Attached to opposite ends of threaded stud 60 are closure nuts 59.

Figure 5:
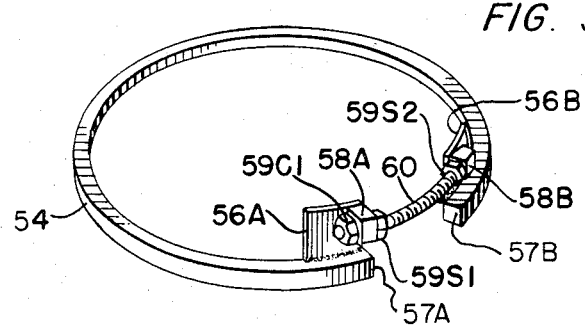
FIG. 5 is a perspective view of a snap-ring assembly of the present invention.

Turning momentarily to the perspective view of FIG. 5, the construction of the split snap-ring assembly will be more readily apparent. As shown, the snap ring assembly includes a square split ring 54 with two ends 57A and 57B formed at the split. Extending from each end 57A, and 57B substantially parallel to the axis of the joint to be restrained are corresponding transverse pieces 56A and 56B. Lugs 58A and 58B are welded respectively to transverse piece 56A and transverse piece 56B and extend outwardly therefrom. The threaded stud 60 is engaged in drilled holes in the lugs 58A and 58B and extends beyond the lugs to receive a closure nut 59C1 and 59C2 at each end. The two closure nuts 59C1 and 59C2 allow one to decrease the diameter of the snap ring 54. Threaded on stud 60 between lugs 58A and 58b are two spreader nuts 59S1 and 59S2. The two spreader nuts 59S1 and 59S2 allow one to increase the diameter of the snap-ring. Note that although FIG. 5 shows stud 60 as being curved, this is an alternate construction. In the preferred form stud 60 is straight as indicated by the absence of curved phantom lines in FIGS. 3 and 4.

Turning back to FIG. 3, it will be noted that the two closure nuts 59C1 and 59C2 have been adjusted such that snap-ring 54 is compressed, reducing its diameter slightly so that the inward flat surface of ring 54 contacts the outer surface of spigot 40 substantially around the entire circumference of spigot 40. In this position the bearing snap-ring assembly including its snap ring 54, transverse pieces 56A and 56B, lugs 58A and 58B, stud 60, nuts 59C1, 59C2, 59S1, and 59S2 are in the position for allowing the socket to be mounted to the spigot 40.

Referring to FIG. 4, the restrained pipe joint of the present invention is illustrated with the socket 42 being placed around spigot 40. To assemble the joint, socket 42 is slid onto the end of spigot 40. It will be readily understood that socket 42 may include a gasket 46 installed as disclosed in the aforenoted MacKay patent. It will further be understood that socket 42 may be one end of a pipe having a spigot at its other end, whereas the spigot 40 may include a socket at its end which is not shown. Only a fragmentary section is shown for simplicity. Typically the pipe may have a diameter of the order of 24 inches and a length of several feet.

After spigot 40 has been inserted into the cavity of socket 42 with its end passing beyond gasket 46 and its exterior surface in sealing engagement with gasket 46, the closure nuts 59C1 and 59C2 may be loosened such that snap ring 54 will expand radially outward from its position in FIG. 3 to that shown in FIG. 4. It may or may not be necessary to caulk the snap-ring into its final position in the assembled joint as shown in FIG. 4 after the closure nuts 59 are released to the ends of the stud 60. Further, spreader nuts 59S1 and 59S2 may be adjusted to push lugs 59A and 59B apart thereby increasing the diameter of split snap-ring 54 and insuring contact between snap ring 54 and a retaining groove 64 within the socket cavity and formed by the inside diameter of socket or bell 42. As shown in FIG. 4, the inner diameter surface of bearing ring 54 is separated from (i.e., not in contact with) other surfaces such as the surface of spigot 40. The end of socket 42 includes a radially inwardly projecting lip portion 62 which in combination with the radially outwardly projecting portion or spigot ring 44 of spigot 40 will prevent the socket 42 from separating from spigot 40. The retaining groove 64, lip portion 62, and associated portion of socket 42 act as a bearing ring retaining portion to retain bearing or snap ring 54. In particular, the application of an axial separating force to either socket 42 or spigot 40 will cause snap ring 54 to bear between and against the inside surface of inwardly projecting lip 62 and the vertical surface of outwardly projecting spigot ring 54. As shown, the lip portion 62 of socket 42 may be tapered or inclined slightly radially outward to facilitate the slipping of socket or bell 42 over the spigot ring 44 and snap ring 54.

The thickness T of snap ring 54 is the same as the thickness of spigot ring 44 as shown in FIG. 3 and is less than the difference between the smallest inner radius of the cylindrical socket at its lip portion and the outer radius of the cylindrical spigot 40. This relationship in the dimensions of the parts is necessary to allow socket 42 to freely slide onto spigot 40. Similarly, the smallest inner diameter of the cylindrical socket at its inwardly projecting lip portion must be greater than the outer diameter of the spigot ring.

Although the spreader nuts 59S1 and 59S2 may be used for insuring contact between the snap ring and the retaining groove 64, it is preferable if the natural outside diameter of the split snap ring is larger than the inside diameter of the retaining groove 64 in the cavity of the cylindrical. The natural outside diameter of the split snap ring 54 is defined as that outside diameter which the snap ring will assume when unconstrained by the ring adjuster comprising lugs 58A and 58B, stud 60, and nuts 59C1, 59C2, 59S1, and 59S2. By making the natural outside diameter of the snap ring larger than the inside diameter of the cylindrical socket 42 at its retaining groove 64, one insures that the stripping of the threads on stud 60 or the loss of stud 60 will not cause the snap ring 54 to slip out of its locking position. That is, snap ring 54 will maintain contact with the retaining groove 64 by virtue of its own resiliency.

The assembly of the present locked pipe joint may be summarized as follows:

1. The snap-ring assembly should be assembled snugly onto the spigot as shown in FIG. 3. As mentioned above this is done by adjusting the closure nuts 59C1 and 59C2, the snap-ring or bearing ring being contracted to lie on an outer surface of the spigot. A small hammer may be used to tap the ring substantially flush with the spigot ring prior to assembly.
2. Clean and lubricate spigot and socket surfaces as per normal assembly procedure. In addition to lubricating the bevel, sealing surface, and inside surface of the gasket, lubricate the exposed surfaces of the welded-on ring and snap-ring assembly as well.
3. Assemble the joint in essentially straight alignment as per normal procedure by sliding the socket 42 onto the end of spigot 40 or otherwise positioning the spigot and bearing ring within the socket until the spigot contacts the rear of the socket. At this point, the spigot ring and snap-ring assembly should have disappeared inside the socket.
4. Loosen the outside nuts on the closure assembly to the end of the studs to allow the snap-ring to spread out against the inside of the socket. If necessary, chalk the ring. A caulking iron, chisel or other flat tool may be used at intervals around the joint till the ring obviously snaps into the ring retaining groove of the socket. This should be noticeable as an obvious spreading of the ring struts on the closure stud.
5. Make sure the snap-ring is correctly seated in the socket by visual observation and/or inspection with a feeler guage around the joint. As will be apparent from FIGS. 3 and 4, the ring 54 will seat within the groove 64 by radially expansion movement only. That is, if the ring 54 was properly placed adjacent spigot ring 44 and the spigot is contacting the rear of the socket, expansion of ring 54 will necessarily seat it within the retaining groove 64 without moving it axially.
6. Tighten the inside nuts on the closure stud out firmly against the ring struts to insure intimate and positive contact of the snap-ring in the socket groove. Excessive torque on the inside nuts which might result in bending of the ring ends of closure assembly is not required.

In addition to axial separating forces parallel to center line 66, internal or external forces may deflect the axis of spigot 40 relative to the axis of socket 42. It is therefore necessary that the joint respond to these internal or external forces. For the present invention, the amount of deflection the joint can achieve in installation is approximately equal to the arctangent of the measure of movement the spigot may have in relation to the socket after the spigot is pushed as far as it will go into the socket in straight alignment and divided by the median diameter A of the assembled snap ring. The allowable deflection will be approximately as follows:

$$\text{Deflection} = \text{Arctan}((B-C)/A).$$

wherein B represents the distance shown between the edge of spigot ring 44 and the edge of separating lip 62 and A represents the median diameter of the snap ring 54 in its assembled (locked) position.

Figure 6:
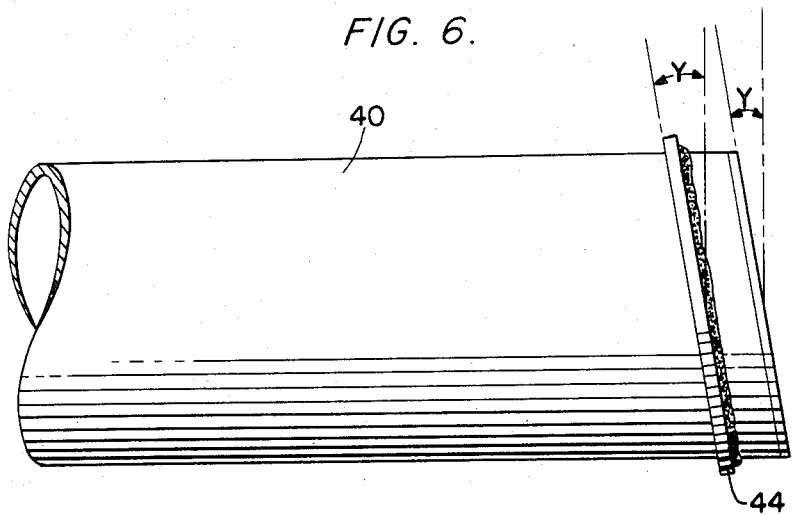
FIG. 6 is a fragmentary view of a spigot end of a pipe and spigot ring illustrating a modified embodiment of the present invention to furnish determinate joint deflection in the snap-ring joint.

Should more deflection be desired than is allowed by the above equation, a determinate amount of deflection might be achieved by welding the spigot ring onto the spigot at a prescribed angle Y to the pipe axis as shown in FIG. 6. Depending on the configuration of the rear of the gasket socket (not shown in FIG. 6), it may or may not be desirable to bevel the fitting end of spigot 40 to be parallel to the spigot ring 44.

Referring again to FIG. 4, a unique aspect in the relationship between the snap ring 54 and the ring adjuster comprising lugs 58A and 58B, stud 60, and nuts 59C1, 59C2, 59S1 and 59S2, will be discussed. Snap ring 54 defines a ring plane of width C, which plane will be substantially perpendicular to center line 66. Additionally, socket 43 defines an end plane EP, which plane will also be substantially perpendicular to center line 66. Noting that anything to the right of the end plane EP as viewed in FIG. 4, may be considered as axially within the socket 42 and that anything to the left of end plane EP, as viewed in the drawing, is axially outside of socket 42, it will be readily appreciated that the ring adjuster comprising lugs 58A and 58B, stud 60, and nuts 59C1, 59C2, 59S1, and 59S2 is axially outside of socket 42. Additionally, it will be readily appreciated that the use of transverse pieces 56A and 58B makes this feature possible as well as allowing for the ring adjuster to be outside of the ring plane defined by the dimension C of snap ring 54. Note also that the socket 42 and spigot 40 have only continuous annular internal and external contours, the socket 42 and spigot 40 containing no bolt holes, lugs, slots, windows, holes, or other annular discontinuities.

Figure 7:
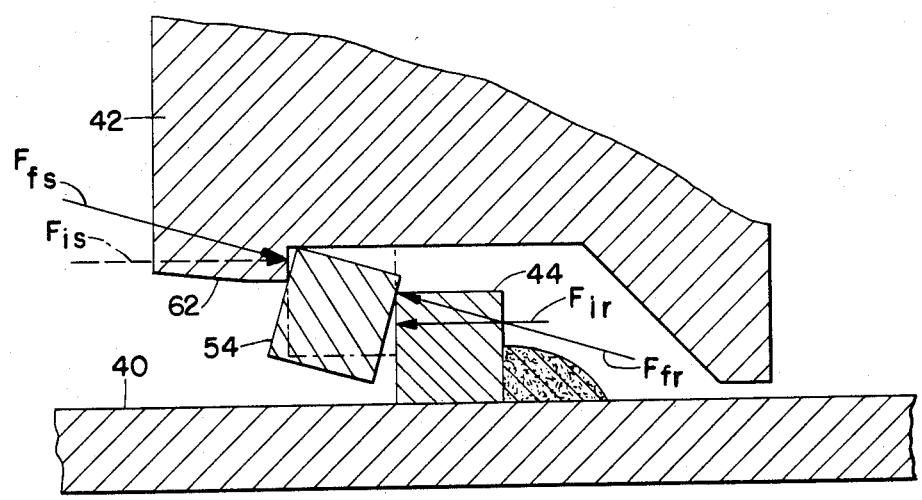
FIG. 7 is a cross-sectional fragmentary view of a joint illustrating the rotation of the snap-ring of the present invention in response to a joint separating force.

Turning now to FIG. 7, the response of the present inventive pipe joint to a great joint separating force will be discussed. Specifically, FIG. 7 shows in partial cross-section spigot 40, socket 42, spigot ring 44, and snap ring 54. Upon initial application of axial separating forces, the snap ring, which is square in cross-section as shown, will assume the dotted position squarely in contact with the lip 62 and the spigot ring 44. Because of the radial offset between the initial separating force $F_{is}$ and the initial retaining force $F_{ir}$, the application of additional external or internal axial separating forces will cause the square cross-section snap ring 54 to rotate slightly in response to the force couple created by this radial offset. As the snap ring 54 rotates, it wedges itself securely between the inwardly projecting lip portion 62 and the spigot ring 44. Consequently and as shown, a substantial radial component of force is realized, resulting in circumferential tensile stresses in the pipe socket and circumferential compressive stresses in the pipe spigot. Thus, the weld 44W used to attach the spigot ring 44 to the spigot is not subjected to direct shear, nor is the relatively shallow lip portion 62 of the pipe socket 42 subjected to direct shear. Instead of acting in direct shear, the stresses are transferred to the relatively more massive pipe spigot and socket sections. The strength of the joint is therefore increased. The ability of the relatively flexible square snap ring to rotate differing amounts responsive to force loads also allows this joint to maintain line contact with the socket 42 and the spigot ring 44 over much of its circumference when the pipe joint is held in a slightly deflected position by an external force (such as soil reaction) and subjected to the joint separating actions of internal or external forces.

The many advantages of the present invention over the prior art should be readily apparent. Specifically, the present invention provides for a great versatility and applicability in the layout and installation of pipes in ductile iron pipe lines. Furthermore, the present invention provides for a socket pipe joint having the advantage of simplicity of design and installation and high strength which allows stresses to be transferred to massive pipe sections rather than being applied directly to welds and lips. In particular and unlike much of the prior art, the assembly and disassembly of the present pipe joint will not require a lifting machine to handle and install the restraining component(s) of large diameter pipes and fittings. Further the cost of manufacturing and installation is quite low for the present invention, while additionally being capable of withstanding larger separating forces.

Although the present inventive pipe joint is useful with pipes of many different materials, the present pipe joint is especially well suited for use with ductile iron pipes. The snap ring assembly including the snap ring 54, transverse pieces 56A and 56B, lugs 58A and 58B, stud 60, and nuts 59C1, 59C2, 59S1 and 59S2 may preferably be made of a low alloy corrosion resistant steel.

The present invention is not limited to the exact structures shown, but is capable of a variety of mechanical embodiments. Various changes which would now suggest themselves to those skilled in the art may be made in the structural details of the present invention without departing from the inventive concept. Accordingly, the scope of the present invention should be determined by reference to the appended claims.

I claim:

1. A method of assembling a pipe joint assembly having a first pipe with a cylindrical socket, said cylindrical socket having a radially inward retaining lip adjacent a retaining groove; a second pipe with a cylindrical spigot, said cylindrical spigot having an outwardly projecting portion; a ring assembly including a bearing ring having two ends at a split, said bearing ring uniquely defining a plane, two transverse pieces, each transverse piece attached to one end of said bearing ring and extending away and outside from the plane defined by said bearing ring, a threaded rod mounted to extend between each of said two transverse pieces, a first spreader nut on said threaded rod, said first spreader nut operable to expand the diameter of said bearing ring, and a first closure nut on said threaded rod, said first closure nut operable to contract the diameter of said bearing ring; the steps comprising:
   (a) contracting said bearing ring around said spigot adjacent to said outwardly projecting portion by adjusting said first closure nut to bring said transverse pieces closer together;
   (b) positioning said spigot and said contracted bearing ring within said socket, said transverse pieces extending out from said socket;
   (c) loosening said bearing ring from said spigot such that the natural resilience of said bearing ring expands it to seat within said retaining groove, and
   (d) tightening said bearing ring against said retaining groove by adjusting said first spreader nut to lock said pipe joint against axial separation by said bearing ring bearing between said retaining lip and said outwardly projecting portion.

2. The method of claim 1 wherein said positioning step causes said spigot to contact a rear of said socket.

3. The method of claim 2 wherein said bearing ring seats within said retaining groove by radial expansion movement only of said bearing ring following said positioning step.

4. The method of claim 1 wherein said positioning step causes said bearing ring to be clear and axially inside of said retaining lip and said bearing ring will necessarily seat within said retaining groove when its diameter is increased following said positioning step.

5. The method of claim 4 wherein said contracting step causes said transverse pieces to lie along an outer surface of said spigot, each of transverse pieces touching said outer surface along its entire length.

6. The method of claim 1 wherein said threaded rod is threaded at both ends; and said pipe joint assembly further includes a second spreader nut on said threaded rod, said second spreader nut operable to expand the diameter of said bearing ring, and a second closure nut on said threaded rod, said second closure nut operable to contract the diameter of said bearing ring; and said loosening step includes adjusting one or both of said closure nuts.

7. The method of claim 6 wherein said tightening step includes adjusting said second spreader nut.

8. A method of assembling a pipe joint having a first pipe with a cylindrical socket, said cylindrical socket having a radially inward retaining lip adjacent a retaining groove; a second pipe with a cylindrical spigot, said cylindrical spigot having an outwardly projecting portion; a ring assembly including a bearing ring having two ends at a split, said bearing ring uniquely defining a plane, two transverse pieces, each transverse piece attached to one end of said bearing ring and extending away and outside from the plane defined by said bearing ring, a threaded rod mounted to extend between said two transverse pieces, a first closure nut on said threaded rod, said first closure nut operable to contract the diameter of said bearing ring; the steps comprising:

(a) contracting said bearing ring around said spigot adjacent to said outwardly projecting portion by adjusting said first closure nut to bring said transverse pieces closer together and to lie on an outer surface of said spigot, each of said transverse pieces touching said outer surface along its entire length;

(b) positioning said spigot and said contracted bearing ring within said socket, said transverse pieces extending out from said socket;

(c) loosening said bearing ring from said spigot such that the natural resilience of said bearing ring expands it to seat within said retaining groove to lock said pipe joint against axial separation by said bearing ring bearing between said retaining lip and said outwardly projecting portion.

9. The method of claim 8 wherein said positioning step causes said spigot to contact a rear of said socket.

10. The method of claim 9 wherein said bearing ring seats within said retaining groove by radial expansion movement only of said bearing ring following said positioning step.

11. The method of claim 8 wherein said positioning step causes said bearing ring to be clear and axially inside of said retaining lip and said bearing ring will necessarily seat within said retaining groove when its diameter is increased following said positioning step.

12. The method of claim 8 further includes the step of tightening said bearing ring into said retaining groove after said loosening step, said tightening step accomplished by adjusting a first spreader nut to expand the diameter of said bearing ring.

13. The method of claim 8 wherein said threaded rod is threaded at both ends; and said pipe joint assembly further includes a second spreader nut on said threaded rod, said second spreader nut operable to expand the diameter of said bearing ring, and a second closure nut on said threaded rod, said second closure nut operable to contract the diameter of said bearing ring; and said loosening step includes adjusting one or both of said closure nuts.

14. The method of claim 13 wherein said tightening step includes adjusting said second spreader nut.

* * * * *